United States Patent [19]

Johnson et al.

[11] Patent Number: 5,452,749

[45] Date of Patent: Sep. 26, 1995

[54] CORROSION INHIBITOR AND SEALABLE THREAD PROTECTOR END CAP FOR TUBULAR GOODS

[75] Inventors: Donald M. Johnson, Woodlands; John S. Ippolito, Houston, both of Tex.

[73] Assignee: Centrax International Corp., Houston, Tex.

[21] Appl. No.: 263,765

[22] Filed: Jun. 22, 1994

Related U.S. Application Data

[60] Division of Ser. No. 82,996, Jun. 25, 1993, Pat. No. 5,252,383, which is a continuation-in-part of Ser. No. 779,354, Oct. 18, 1991, abandoned.

[51] Int. Cl.$^6$ ................................................. B65D 59/00
[52] U.S. Cl. ........................................ 138/96 T; 138/89
[58] Field of Search ................................ 138/96 T, 89, 138/96 R

[56] References Cited

U.S. PATENT DOCUMENTS

| | | | |
|---|---|---|---|
| 1,254,514 | 1/1918 | Lehmann | 138/96 T |
| 1,347,765 | 7/1920 | Shrum | 138/96 T |
| 1,756,167 | 4/1930 | Avery | 138/96 T |
| 1,820,140 | 8/1931 | Hunter | 138/96 T |
| 1,837,345 | 12/1931 | Thomas | 138/96 R |
| 2,022,189 | 11/1935 | Engstrom | 138/96 T |
| 2,156,113 | 4/1939 | Engstrom . | |
| 2,156,221 | 4/1939 | Kahn et al. . | |
| 2,187,217 | 1/1940 | Winslow . | |
| 2,204,130 | 6/1940 | Engstrom . | |
| 2,212,423 | 8/1940 | Lytle | 138/96 T |
| 2,251,897 | 8/1941 | Severn | 138/96 T |
| 2,826,222 | 3/1958 | Case . | |
| 2,942,625 | 6/1960 | Costanzi . | |
| 2,977,993 | 4/1961 | Scherer . | |
| 3,000,402 | 9/1961 | Bowman, jr. . | |
| 3,056,427 | 10/1962 | Higgins . | |
| 3,104,681 | 9/1963 | Gray, Jr. . | |
| 3,485,271 | 12/1969 | Halsey | 138/96 T |
| 3,574,312 | 4/1971 | Miller . | |
| 4,020,873 | 5/1977 | Palarino . | |
| 4,210,179 | 7/1980 | Galer | 138/96 T |
| 4,438,783 | 3/1984 | Dreyfess et al. . | |
| 4,487,229 | 12/1984 | Dreyfess et al. . | |
| 4,549,337 | 10/1985 | Newell et al. | 138/96 T |
| 4,582,090 | 4/1986 | Chase et al. | 138/96 T |
| 4,614,207 | 9/1986 | Steinhagen . | |
| 4,733,888 | 3/1988 | Toelke | 138/96 T |
| 4,757,594 | 7/1988 | Fraering, Jr. . | |
| 4,796,668 | 1/1989 | Depret . | |
| 5,303,743 | 4/1994 | Vincent | 138/96 T |

FOREIGN PATENT DOCUMENTS 259113  10/1926  United Kingdom ................ 138/96 T

*Primary Examiner*—James E. Bryant, III
*Attorney, Agent, or Firm*—Philip T. Golden; Winstead Sechrest & Minick

[57] ABSTRACT

A liquid anticorrosion composition adapted for application to ferrous tubular goods is provided comprising an aqueous solution of cyclohexylammonium benzoate and a benzoate salt, which is preferably prepared by reacting cyclohexylamine with excess sodium benzoate in an aqueous alcohol solvent. A sealable thread protector end cap which protects the precisely machined threads from physical abuse and which isolates or seals from the environment the corrosion inhibitor composition is also provided.

4 Claims, 1 Drawing Sheet

CORROSION INHIBITOR AND SEALABLE THREAD PROTECTOR END CAP FOR TUBULAR GOODS

This is a division of application Ser. No. 08/082,996 filed Jun. 25, 1993, now U.S. Pat. No. 5,252,383, which was a continuation-in-part application of Ser. No. 07/779,354 filed Oct. 18, 1991, now abandoned.

FIELD OF THE INVENTION

This invention relates to useful compositions for corrosion inhibition in metal products and to a sealable thread protector end cap, the combination of both being especially suitable for thread protection and for inhibiting corrosion of oil country tubular goods during short term (less than one year) storage.

BACKGROUND OF THE INVENTION

Tubing and casing (tubular goods) for oil and gas drilling and production are typically held in a storage or pipe yard after they have been received from the fabricator, or returned from a downhole installation. The storage is not permanent, but typically extends for up to a year, or until a need arises for a specific size and grade of tubing or casing. Usually, the tubular goods are cleaned, if necessary, before storage, with the hope that there will be no need for a further cleaning or finishing step before they are transported to a rig site. However, corrosion due to water and oxygen may quickly attack the precisely machined threads, which then cannot provide a satisfactory coupling without being cleaned again.

The exposed threaded ends of tubular metal goods are conventionally protected in one or more ways, so as to extend the period they can be stored. Closed-end thread protectors, usually plastic or elastomeric caps, or end caps made from metals such as steel, brass, or copper, are placed over the threaded ends thus providing protection from physical abuse, but this alone is not sufficient to do more than slow the corrosion process. Therefore, products such as API (American Petroleum Institute) modified thread compound, "Kendex Storage Compound" or similar fossil grease-based or wax compounds, have been applied to prevent or inhibit corrosion. These products can contain hazardous materials, such as lead, copper, zinc and hydrocarbons which typically are removed prior to downhole placement of the tubular goods. Various cleaning solutions, such as solvent varsol naphtha or diesel oil, are used in removing such materials. While in some cases the applied compounds and solids are captured and recycled, in many others they have been allowed to run or drip onto the ground below, presenting the problems of hazardous waste contamination and removal.

Various other corrosion prevention and inhibition compositions are known and in use, but they do not meet all of the requirements for the oil country installation. Some are toxic, and a number of them are carcinogenic. They are often difficult to apply, not sufficiently long lasting, and must often be cleaned if they are to be employed with a thread lubricant and sealant. In this respect, a thread sealant that has recently been widely adopted for use is "SEALLUBE", a product of the Loctite Corporation of Newington, Conn. This is an anaerobic composition of viscous nature that converts to a solid polymer in the absence of air. Compatibility of anticorrosion adjuvants with this composition is of particular importance because of its increasing use.

One corrosion inhibitor that has been employed for the protection of tubular goods and other steel products is sodium benzoate. It is usually combined with sodium nitrate for use as a corrosion inhibitor for ferrous metals and is easily applied because it dissolves in water. It does not afford, however, sufficiently long lasting protection, due to its high water solubility. Another class of materials that has been used comprises vapor phase inhibitors or vaporizable corrosion inhibitors (VCI), and these provide somewhat longer protection. This type of inhibitor sublimes into a vapor that condenses on the surface to be protected, and provides a film of 20 to 50 angstroms in thickness, that is replenished during the continuation of the sublimation action. The VCI compounds are sometimes disposed within a wrapping having a porous surface accessible to the metal, so that the vapors from the powder within the wrapping condense on the metallic surface and form a protective film. In some instances, the powders are contained within a bag or holder placed over the threaded end of the tubular goods. In either procedure, application and removal is overly time consuming, and cleaning of the tube stock may still be necessary, particularly where the powder remains in direct contact with the threaded surface. In addition, the protection afforded is less than desired.

Therefore, a continuing need exists for compositions effective to inhibit the corrosion of metallic tube goods, which are easy to apply, and which offer long-lasting protective effects. Moreover, with the use of such compositions, a thread protector which protects the precisely machined threads from physical abuse and which isolates or seals the treated threads and the corrosion inhibitor compositions from the environment is needed.

SUMMARY OF THE INVENTION

The present invention provides a liquid composition for inhibiting the corrosion of ferrous metal surfaces, comprising about 5–25 wt-% cyclohexylammonium benzoate, about 8–50 wt-% of a benzoate salt and, optionally, 5–10% of a $(C_2-C_5)$alkanol, preferably isopropanol, in 30–50% water, preferably distilled water. Preferably, the benzoate salt, e.g., sodium benzoate is present in weight ratio to the cyclohexylammonium benzoate of about 1.1:15:1, respectively. When applied to metal surfaces, such as the threads of tubing, the present composition yields a barrier film which can effectively protect the threads from corrosion (i.e., from rusting) for prolonged periods of at least up to 90 days, following one application.

Although pre-formed cyclohexylammonium benzoate can simply be combined with the benzoate salt, such as an alkali metal or ammonium benzoate, in water-alcohol to form the present composition, it is preferred to form cyclohexylammonium benzoate in situ by reacting cyclohexyl amine with an excess of the benzoate salt. For example, mixture and reaction of 2–15 g of cyclohexyl amine (20.2–151.5 mmol) with 25–55 g of sodium benzoate (174–381 mmol) in water (35–50 ml) would yield 4.4–33.2 g of cyclohexylammonium benzoate (20.2–151.5 mmol) in solution, along with 3.2–52 g of sodium benzoate (22.2–361 mmol). Thus, a preferred initial mole ratio of sodium benzoate to cyclohexylamine in the present compositions would be about 1.1–20:1, most preferably about 5–10:1. A final weight-ratio of sodium benzoate to cyclohexylammonium benzoate is preferably about 0.3–10:1, most preferably about 3–5:1.

The present liquid composition can be readily applied to tube stock, e.g., by brushing or spraying, and treated threaded terminal ends can then be covered by a closed end thread protector. The present compositions act by forming thin, coherent adherent, films on the metallic, i.e., iron or steel, surfaces to which they are applied, following evaporation of the solvents. The films may be monomolecular in nature. These thin films can be left in place during the subsequent application of an anaerobic or other thread sealants, as well as during coupling makeup and downhole installation.

In addition, the freezing point of the composition may be lowered without adversely affecting the viscosity of the composition by the addition of an effective amount of a lower ($C_2$–$C_5$)alkanol such as isopropanol. The tubular goods thus treated therefore require no subsequent cleaning steps, as may be required if powdered or greasy anticorrosion compositions are used. The present compositions are neither toxic nor carcinogenic, and thus present no danger to the environment.

The present invention also includes, in its preferred and most protective embodiment, a thread protector end cap with a seal for use on the threads that have been treated with the above-mentioned thread preserver. This closed-end thread protector performs two functions. First, it keeps the threads of the oil field pipe from getting banged up while rolling around pipe trucks or pipe yards, and second, it isolates or seals from the environment the corrosion inhibitor composition which is applied to the threads. The invention also comprises a method for inhibition of corrosion on threaded tubular goods which includes the application of the liquid composition and the isolation of the treated threads from the environment.

In this particular invention, a plastic or composite protector with or without a metal shield on the outside is used as the end cap. According to one embodiment of the invention, a machined groove is put in the opening of the end cap, and an O-ring or other means for sealing is placed in the groove. When the end cap is screwed on, the O-ring keeps moisture and water from seeping into the end cap and thus washing away this water-soluble thread preserver. A variety of compositions for the sealing means may be used having various hardnesses for different climates.

BRIEF DESCRIPTION OF THE DRAWINGS

The accompanying drawings, which are incorporated in and form a part of the specification, illustrate embodiments of the present invention, and, together with the description, serve to explain the principles of the invention. In the drawings.

Figure 1:
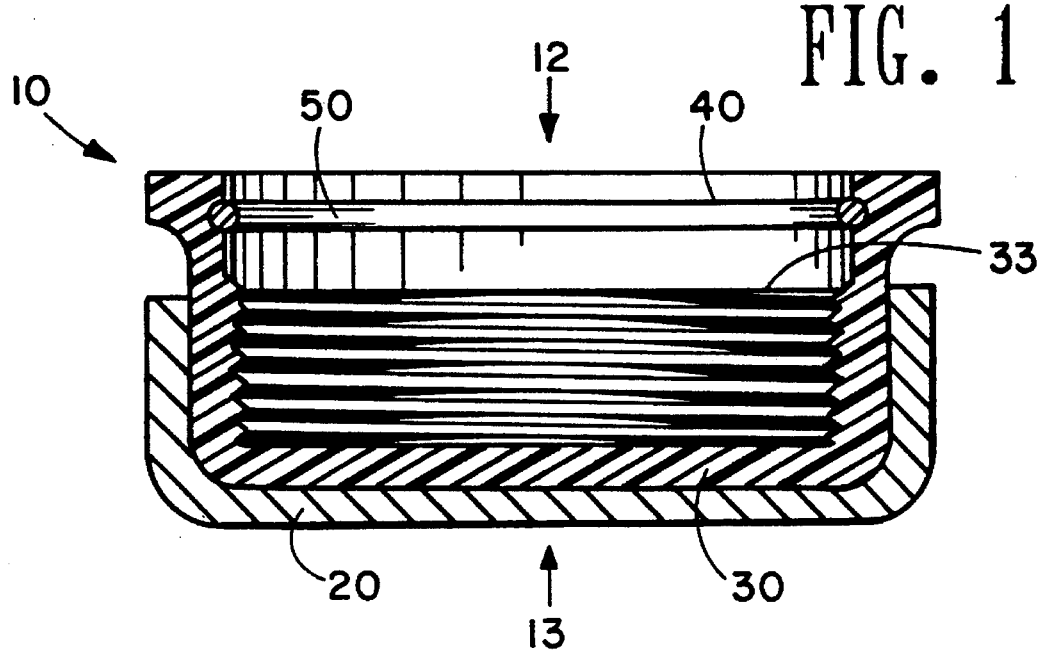
FIG. 1 is a transverse vertical section of the thread protector with an O-ring.

It is to be noted that the drawings illustrate only typical embodiments of the invention and are therefore not to be considered limiting of its scope, for the invention will admit to other equally effective embodiments.

DETAILED DESCRIPTION OF THE INVENTION

In accordance with the invention, applicant has devised an aqueous solution that is stable and can conveniently and safely be applied to tubular ferrous metal goods, such as threaded pipe, in which the active ingredients are the reaction product of a salt of benzoic acid and the vaporizable corrosion inhibitor cyclohexylamine. The resultant cyclohexylammonium benzoate remains dissolved in the solution, and upon application, and evaporation of the solvents, sublimes gradually, the vapor condensing on the metal surface and forming a very thin film in the range of 20–50 angstroms in thickness. The vapor continues to condense and replenish the layer as needed as long as the inhibitor is active. At the same time, the excess benzoate salt, preferably sodium benzoate, functions as an antioxidant, inhibiting corrosion processes at the surface of the metal. Consequently, the result of this cooperative action is a substantially longer active interval of protection, and corrosion resistance that is superior to that which can be obtained with either ingredient alone. Usage of this aqueous solution in practice together with conventional closed end thread protectors that form secure seals, results in an assured 90 days of protection under field conditions of any type, and as much as a year under many circumstances, when the conditions are not so severe.

Further, in accordance with the invention, a minor proportion of a ($C_2$–$C_5$)alkanol, e.g., isopropyl alcohol (isopropanol) is incorporated to lower the freezing point of the solution, such that the solution can be more readily utilized in cold weather conditions. The active powders are readily dissolved in water, the amount of which can therefore be adjusted within a wide range to assure that the salts are completely dissolved and that the solution is low enough in viscosity to be applied by spraying or brushing on the threads and seals. The solution is neutral or slightly basic, thus providing a buffering action to reduce any tendency toward acid-enhanced corrosion. Both the alcohol and the cyclohexylammonium benzoate are azeotropic in character, when in solution, such that there is a further lowering of the freezing point due to this characteristic.

Among the features of this composition, therefore, are the fact that it contains no hydrocarbon-based wax, grease or oil. Threads and seals do not need to be recleaned before applying conventional thread compounds, such as "SEAL-LUBE" or API thread compound. Consequently, the problems heretofore encountered with collecting and disposing of hazardous waste solvents, or allowing such material to collect at the pipe storage, are completely obviated.

The solution also is environmentally compatible, since it contains no phosphates or toxic material, and is antimicrobial and biodegradable. The alcohol can function as a biocide, as does the cyclohexylammonium benzoate, to a lesser extent.

The duration of protection can be extended simply by reapplication. When properly applied, no recleaning of the threads is required at the rig site, prior to running the tubular goods in a downhole installation.

Compositions in accordance with the invention can be prepared by combining, by weight, about:

30–50% water

2–15% cyclohexylamine

25–55% sodium benzoate, and

5–10% ($C_2$–$C_5$)alkanol (optional); to yield finished compositions comprising, by weight, about:

35–80% water

5–25% cyclohexylammonium benzoate

8–50% sodium benzoate, and

5–10% ($C_2$–$C_5$)alkanol (optional)

Thus, a preferred formulation is as follows:

48% distilled water

10% cyclohexylammonium benzoate

36% sodium benzoate

6% isopropyl alcohol

This composition is of acceptably low viscosity, and freezing point (ca. 11° C.) (pH=7.5).

The cyclohexylammonium benzoate is available as "Corroless" vapor phase inhibitor from Corroless North America, Inc., Stamford, Conn.

The chemical and physical properties of the solution are as follows, referring to standard ASTM tests:

| Odor: | Odorless |
|---|---|
| Appearance: | Light yellow |
| Solubility: | Water soluble |
| D-3716 Specific Gravity: | 1.13 |
| pH: | 7.5 |
| D-233 Reid Vapor Pressure at 100° F.: | 0.4 psi |
| Boiling Point (initial): | 88° C. (190° F.) |
| Freezing Point: | −11° C. (12° F.) |

An analysis of safety data shows that the flash point is 85° C. (180° F.) or more than the auto-ignition temperature which is greater than 600° C. (1,112° F.). There are no carcinogens involved and health, flammability, reactivity and special or personal protection factors are all one or zero under the NFPA and HMIS ratings, respectively.

Cyclohexylamine and various benzoate salts are available from Aldrich Chemical Co., Milwaukee, Wis.

Examples 1–9 used 2⅜" EUE tubing pup joints carbon steel were selected for the test. Both pin and coupling threads were sandblasted to a white metal condition and a uniform coating of the preferred formulation identified above was applied. Plastic thread protectors were installed, but these were inexpensive commercial products that did not necessarily snugly fit in the tubing ends, as noted below. The different pins (tubing ends) and boxes (collars) were serially checked, at approximately ten-day intervals, with the following observations:

Set 1—Twelve days from the start—Slight discoloration on the pin near the thread runout (last threads), without corrosive pitting. No discoloration on the box. In both instances, and in the further checks noted below, there was a crusty buildup of the dried solution that presented no impediment to application of a thread lubricant and subsequent coupling, and downhole use.

Set 2—21 days from start—No discoloration on the pin or box.

Set 3—30 days from start—No discoloration on the pin or box.

Set 4—41 days from start—Minor rust at the runout threads on the pin, and rust dots on the chamfer or pin end. On the box, moisture was standing on the threads and rust was present in the coupling recess, both of these due to inadequate closure by the thread protector.

Set 5—51 days from start—Rust was observed in the runout threads from water standing in the thread protector of the pin, and rust was present in the coupling recess of the box.

Set 6—70 days from start—(The pipe intended for sixty-day inspection having been removed for unknown reasons). On the pin there was discoloration and rust bloom at the thread runout position and on the box there was some rust in the coupling recess.

Set 7—82 days from start—Rust was present in the lower quadrant of the pin from water standing in the protector but no rust was present in the box.

Set 8—89 days from start—Rust was present in the lower quadrant of the pin from water standing in the protector. There was some rust in the coupling recess of the box.

Set 9—101 days from start—There was rust in the lower quadrant of the pin from water standing in the protector and some rust in the coupling recess of the box. Two threads of the box were rusted due to standing water.

On the above serial inspections of the different sections of tubing, the rust was found to match the places in the thread protectors where water had been standing. Usually this was at the thread runout region. In other words, when there was no engagement between the thread protector and the threads, the rust began to appear. However, the rust that appeared was in such limited areas and so light that it could easily be wire brushed off. This condition can readily be totally avoided through the use of better thread protectors or more close checking of the thread protectors after installation.

At a later time, 250 days after the installation of the test pieces in the storage yard, five of them were reinspected. No further solution in accordance with the invention or any other corrosion inhibitor had been applied. These inspections were of the tubing sets identified as nos. 1, 3, 5, 6 and 8 above. In all instances, there was only slight discoloration on the imperfect threads (runout or last thread region) and on coupling recesses. The remainder of the threads, the great majority of the surface, had the appearance of just being sandblasted. Consequently, there had been no further change from the prior report.

The liquid composition of the present invention not only protects tubular ferrous metal goods from corrosion, but the composition is environmentally benign. For ultimate protection, a sealable thread protector end cap is provided to isolate the liquid composition from the environment.

Referring now to FIG. 1, there is shown a transverse vertical section of such a thread protector with an O-ring. The thread protector or end cap 10 has an open end 12 and closed end 13. In one embodiment, the end cap 10 is comprised of two pieces: an outer shell 20 and an inner liner 30. The inner liner 30 is mated within the outer shell 20. In another embodiment, the inner liner 30 preferably includes a plastic threaded sleeve attached within the outer shell 20, here shown as a metallic cup. The plastic threaded sleeve may be held within the outer shell 20 by rivets, screws, adhesive, or other suitable fastening means.

The end cap 10 has a machined groove 40 longitudinally located between the thread termination or outermost thread 33 of the inner liner 30 and the open end 12 of the end cap 10. A seal or O-ring 50 is positioned and arranged within the groove 40. The inner liner 30 would normally have a closed end as shown in the drawings but may suitably be a threaded sleeve which mates with the threads being protected and carries the O-ring 50 in groove 40. In fact, a variety of compositions for the sealing means may be used having various hardnesses for different climates.

Figure 2:
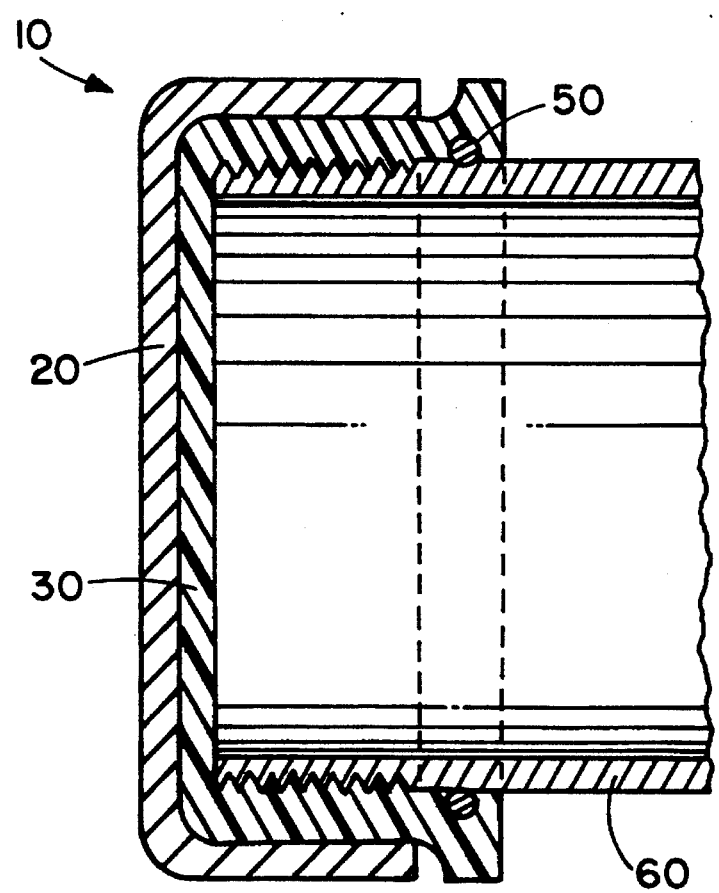
FIG. 2 is a fragmentary longitudinal section of the thread protector applied to the end of a threaded pipe.

Referring now to FIG. 2, there is shown a fragmentary longitudinal section of a thread protector 10 applied to the end of a threaded pipe 60. An O-ring 50, inserted within the machined groove 40, provides a seal at the interface of the pipe end 60 and the plastic threaded sleeve 30 near the open end 12 of the end cap 10.

When the end cap 10 is screwed onto the pipe 60, the O-ring 50 extends inwardly of the diameter of the cap 10 to fit snugly against the unthreaded surface of pipe 60 and keeps water from seeping into the end cap 10 and thus washing away the water-soluble thread preserver. As such, a method of protecting threaded end portions of oil field tubular goods is provided wherein the corrosion inhibiting composition is applied to the threads of the tubular goods and a sealable thread protector end cap having a closed end bottom wall portion and cylindrical side walls joined thereto is attached to the end of the pipe thereby covering the threads and isolating or sealing the corrosion inhibiting composition from the environment.

More generally, the invention includes a method of protecting threaded, cut, or machined end portions of oil field tubular goods against rust, pitting, moisture induced corrosion damage and adverse weather conditions during outdoor storage prior to field use by coating the machined end portions with a non-grease-based protective composition over all of the machined surface portions thereof; applying, in confronting intimately abutting relation to the machined surface portions at an end of the tubular cylindrical goods, an end cap member shaped to provide a surface conforming substantially to and disposed in intimately abutting confronting relation to threads of the machined end surface portions forming the threaded coupling ends; and isolating the protective composition from the environment by means of a seal.

This invention has been described with reference to various specific and preferred embodiments and techniques. However, it should be understood that many variations and modifications may be made while remaining within the spirit and scope of the invention.

What is claimed is:

1. A thread protector for pipe ends comprising:

an outer shell having a closed end and an open end;

an inner liner, mated within said outer shell, said inner liner having a closed end and an open end;

means for attaching said inner liner to the pipe end, said means for attaching being positioned inside said inner liner; and an O-ring positioned within a groove, said groove positioned and arranged between said means for attaching and said open end of said inner liner.

2. A thread protector as in claim 1 wherein said means for attaching comprises threads which engage the threads of the pipe.

3. A thread protector adapted to cover the exposed threaded ends of tubular metal goods comprising:

an outer shell having a closed end and an open end;

an interiorly threaded inner liner, mated within said outer shell, said inner liner having a closed end and an open end and a thread termination longitudinally displaced from the open end;

and interiorly facing circumferential groove longitudinally located between the thread termination and the open end; and a seal positioned and arranged within said groove and extending inwardly beyond the inner diameter of said end cap to sealably engage the surface of the pipe.

4. A thread protector as in claim 3 wherein:

said outer shell is a metallic cup;

said inner liner is a plastic threaded sleeve; and said seal is an O-ring inserted within said groove.

* * * * *